United States Patent
Little (10) Patent No.: US 8,868,781 B2
(45) Date of Patent: Oct. 21, 2014

(54) SERVICE FORWARDING ADDRESSES IN DISTRIBUTED COMPUTING

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 1199 days.

(21) Appl. No.: 11/897,096

(22) Filed: Aug. 28, 2007

(65) Prior Publication Data

US 2009/0063655 A1   Mar. 5, 2009

(51) Int. Cl.
| | | |
|---|---|---|
| G06F 15/16 | (2006.01) | |
| G06F 15/173 | (2006.01) | |
| H04L 29/08 | (2006.01) | |
| G06F 9/54 | (2006.01) | |
| H04L 12/58 | (2006.01) | |

(52) U.S. Cl.
CPC ............... *H04L 67/02* (2013.01); *H04L 51/28* (2013.01); *H04L 51/14* (2013.01); *G06F 9/546* (2013.01)
USPC ........................... 709/239; 709/245; 709/232

(58) Field of Classification Search
CPC ........... G06F 9/00; G06F 15/00; H04L 51/00; H04L 67/00; H04L 12/00
USPC ................... 709/245, 239, 232, 226
See application file for complete search history.

(56) References Cited

U.S. PATENT DOCUMENTS

| | | | |
|---|---|---|---|
| 5,410,703 A | 4/1995 | Nilsson et al. | |
| 6,427,164 B1 * | 7/2002 | Reilly ............................ | 709/206 |
| 6,600,736 B1 * | 7/2003 | Ball et al. ....................... | 370/352 |
| 6,876,652 B1 * | 4/2005 | Bell et al. ....................... | 370/386 |
| 7,080,078 B1 | 7/2006 | Slaughter et al. | |
| 7,159,224 B2 | 1/2007 | Sharma et al. | |
| 7,185,342 B1 | 2/2007 | Carrer et al. | |
| 7,245,712 B2 * | 7/2007 | Hines ........................ | 379/213.01 |
| 7,269,603 B1 * | 9/2007 | Dewan et al. ........................ | 1/1 |
| 7,289,994 B2 | 10/2007 | Nixon et al. | |
| 7,383,541 B1 | 6/2008 | Banks et al. | |
| 7,549,153 B2 * | 6/2009 | Butterworth et al. .......... | 719/317 |
| 8,234,406 B2 * | 7/2012 | Loupia ........................... | 709/245 |
| 2001/0049745 A1 * | 12/2001 | Schoeffler ...................... | 709/238 |
| 2003/0005064 A1 * | 1/2003 | McDowell et al. ............ | 709/206 |
| 2003/0224758 A1 | 12/2003 | O'Neill et al. | |
| 2004/0044998 A1 | 3/2004 | Wildhagen et al. | |
| 2004/0117199 A1 * | 6/2004 | Fremantle et al. ................ | 705/1 |
| 2004/0168153 A1 | 8/2004 | Marvin | |
| 2004/0187095 A1 | 9/2004 | Gilfix et al. | |
| 2005/0149528 A1 * | 7/2005 | Anderson et al. ................. | 707/9 |
| 2006/0020922 A1 | 1/2006 | Takizawa | |
| 2006/0028994 A1 | 2/2006 | Hofmann et al. | |
| 2006/0031414 A1 * | 2/2006 | Betts et al. ..................... | 709/219 |
| 2007/0011126 A1 | 1/2007 | Conner et al. | |

(Continued)

OTHER PUBLICATIONS

Vasudevan, Venu, "A Web Services Primer," XML.com, Published on XML.com http://www.xml.com/pub/a/ws/2001/04/04/webservices/index.html, May 30, 2007, http://webservices.xml.com/lpt/a/760, pp. 1-10.

(Continued)

*Primary Examiner* — Ebrahim Golabbakhsh
(74) *Attorney, Agent, or Firm* — Lowenstein Sandler LLP (57) ABSTRACT

A message sent to a first service addressed in a distributed computing environment having a service oriented architecture is received, wherein the message is directed to a service that is no longer present at the first service address. The message is forwarded to a second service address at which the service is located.

24 Claims, 5 Drawing Sheets

(56) References Cited

U.S. PATENT DOCUMENTS

| | | | |
|---|---|---|---|
| 2007/0074204 A1 | 3/2007 | Curtis et al. | |
| 2007/0078860 A1* | 4/2007 | Enenkiel | 707/10 |
| 2008/0091774 A1 | 4/2008 | Taylor et al. | |
| 2008/0126356 A1* | 5/2008 | Guo et al. | 707/10 |
| 2008/0168458 A1 | 7/2008 | Fachan et al. | |
| 2008/0291908 A1* | 11/2008 | Bachmann et al. | 370/389 |
| 2008/0295088 A1 | 11/2008 | Bhat et al. | |
| 2009/0019106 A1* | 1/2009 | Loupia | 709/203 |

OTHER PUBLICATIONS

"JBossESB Requirements and Architecture," Version: 0.3, Date: May 2, 2006, pp. 1-12.

Van Huizen, Gordon, "JMS: An Infrastructure for XML-based Business-to-Business Communication, Learn how the Java Messaging Service can provide a flexible, reliable, and secure means of exchanging XML-based transactions," JavaWorld.com, Feb. 1, 2000, This story appeared on JavaWorld at http://www.javaworld.com/javaworld/jw-02-2000/jw-02-jmsxml.html, Mar. 14, 2007, pp. 1-13.

Hunt, John, "The Holy Grail of Services: SCA," *Reg Developer >> Code >> Java/J2EE*, Original URL: http://www.regdeveloper.co.uk/2007/03/13/sca_for_soa/, http://www.regdeveloper.co.uk/2007/03/13/sca_for_soa/print.html, Mar. 14, 2007, pp. 1-6.

"Web Services Context Specification (WS-Context)," OASIS, Committee draft version 0.8, Version cleated Nov. 3, 2004, Editors, Mark Little, et al., Copyright © 2004 The Organization for the Advancement of Structured Information Standards [Appendix A], pp. 1-23.

"Web Service Endpoint Identification and Resolution: Use Cases and Requirements," Version 1.0, GWD-I (draft-ggf-wse-id-usecases-1.0-3), Open Grid Services Architecture Working Group, Editors: F. Siebenlist, ANL, et al., Apr. 21, 2006, ogsa-wg@ggf.org, pp. 1-16.

"Why ESB and SOA?," Version 0.3, Date: Jan. 27, 2006, pp. 1-7.

Red Hat Office Action for U.S. Appl. No. 11/982,068 mailed Apr. 1, 2010.

Red Hat Office Action for U.S. Appl. No. 11/982,068 mailed Sep. 29, 2009.

Red Hat Office Action for U.S. Appl. No. 11/982,068 mailed Sep. 1, 2010.

Red Hat Office Action for U.S. Appl. No. 11/982,068 mailed Jan. 20, 2011.

King, Erik, "Perpetual Enterprise Management Service (PEMS) for Next Generation SOA-based Command & Control Systems", Jun. 2005, 26 pages.

King, Erik, "Perpetual Enterprise Management Service (PEMS) for C2 SOA Deployments", Jun. 14, 2005, 23 pages.

Office Action mailed Aug. 23, 2012 for U.S. Appl. No. 11/982,068.

"Service Component Architecture JMS Binding Specification Version 1.1"—Oasis, Oct. 2005 https://www.oasis-open.org/committees/download.php/40046/sca-jmsbinding-1.1-spec-dc04-rev3.pdf.

"Web Methods Integration Server JMC Client Developer's Guide"—webMethods, Dec. 2006 http://documentation.softwareag.com/webmethods/wmsuites/wMdoc/_webM_suite_71/Developer/Developer%207.1/webMethods%20Integration%20Server%20JMS%-Developer's%20Guide%207.1.pdf.

* cited by examiner

SERVICE FORWARDING ADDRESSES IN DISTRIBUTED COMPUTING

TECHNICAL FIELD

Embodiments of the present invention relate to distributed systems, and more specifically to forwarding messages in a service oriented architecture.

BACKGROUND

In distributed computing systems having a service oriented architecture, services may be provided by multiple servers at various locations. For a client to utilize available services, the client must know a service address and a service policy (including protocol and message format requirements) of the services. In conventional service oriented architectures, service addresses and service policies are maintained in a message registry along with service descriptions.

When a service address changes, the service registry must be updated to alert clients of the new service address. A client will not know to look for a new service address in the service registry until it fails to receive a response (or receives a fault) to one or more messages sent to the service at the original service address. Therefore, delays may occur in using services that have relocated to new service addresses. Moreover, there is a lag between when a service is updated, and when the updated service information is reflected in the service registry. Thus, the new service address may not be available immediately. Additionally, for some clients it may be burdensome to query the service registry for new service information when service addresses are changed.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for forwarding messages in a distributed computing system. In one embodiment, a message sent to a first service address in a distributed computing environment having a service oriented architecture is received. The message may be directed to a service that is no longer present at the first service address. The message may be received by a forwarder that may or may not be located at the first service address. The message is then forwarded to a second service address at which the service is located.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "computing", "deleting", "storing", "determining", "notifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

Figure 1:
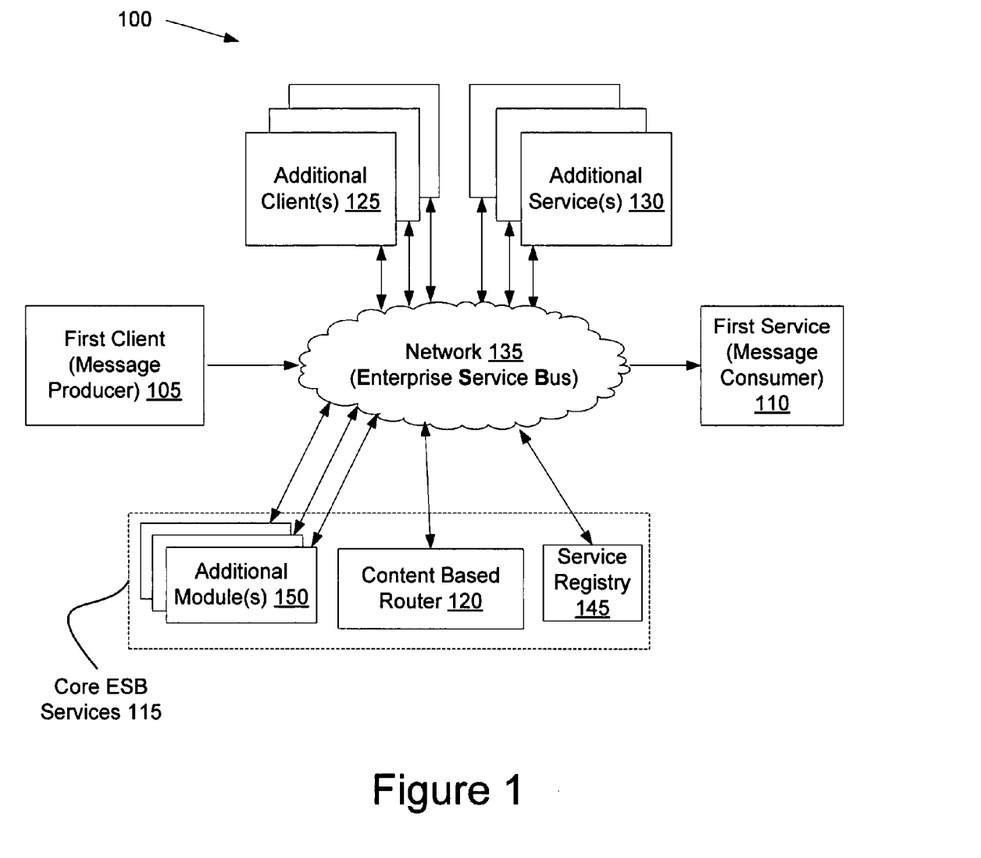
FIG. 1 illustrates an exemplary distributed computing system, in which embodiments of the present invention may operate.

FIG. 1 illustrates an exemplary distributed computing system 100, in which embodiments of the present invention may operate. In one embodiment, the distributed computing system 100 includes a service oriented architecture (SOA). A service oriented architecture (SOA) is an information system architecture that organizes and uses distributed capabilities (services) for one or more applications. SOA provides a uniform means to offer, discover, interact with and use capabilities (services) distributed over a network. Through the SOA, applications may be designed that combine loosely coupled and interoperable services.

The distributed computing system 100 may include clients (e.g., first client 105 and additional clients 125) and services (e.g., first service 110, additional services 130 and core ESB services 115), connected via a network 135. Each of the clients 105 and 125 and services 110, 115, 130 may be both message producers and message consumers, as described below.

The network 135 may be a public network (e.g., Internet), a private network (e.g., Ethernet or a local area Network (LAN)), or a combination thereof. In one embodiment, the network 135 includes an enterprise service bus (ESB). An ESB is an event-driven and standards-based messaging engine that provides services for more complex architectures. The ESB provides an infrastructure that links together services 110, 115, 130 and clients 105 and 125 to enable distributed applications and processes. The ESB may be implemented to facilitate an SOA. In one embodiment, the ESB is a single bus that logically interconnects all available services and clients. Alternatively, the ESB may include multiple busses, each of which may logically interconnect different services and/or clients.

Clients 105 and 125 may be, for example, personal computers (PC), palm-sized computing devices, personal digital assistants (PDA), etc. Clients 105 and 125 may also be applications run on a PC, server, database, etc. In the SOA, clients 105 and 125 include applications that access services 110 and 130. Clients 105 and 125 may be fat clients (clients that perform local processing and data storage), thin clients (clients that perform minimal or no local processing and minimal to no data storage), and/or hybrid clients (clients that perform local processing but little to no data storage).

In the illustrated embodiment, the first client 105 is a message producer. Alternatively, additional clients 125, first service 110, additional services 130 or core ESB services 115 may be message producers. A message producer is a client or service that generates a message. Messages include data that may convey information to, or initiate an event on, a message consumer (e.g., a service or client). A message may be generated for any of a myriad of purposes. For example, the message may be generated to report a purchase of a good, to request contact information, to begin a remote process (e.g., initiate a service), etc.

In one embodiment, a message includes a message header, a message context and a message body. The message header may include a unique message identifier and routing information (e.g., recipient, sender, message priority, etc.). The message header may be used to identify the message, and to route the message to end points (recipients) intended by the message producer and/or as determined by the ESB (e.g., by a router within the ESB). The message may be directed to a specific endpoint (e.g., a specific client or service). Alternatively, the message may be posted to an intermediate location, which one or more endpoints may communicate with to receive the message.

The message context may include properties that support compatibility between services and clients (e.g., between the message producer and message consumers). The message context may provide, for example, custom fields or filters, transactional information (e.g., to identify a distributed transaction or session associated with the message), security information (e.g., authorization information, authentication information, etc.), and so on.

The message body may include data to which a client or service may respond (e.g., by initiating an event). The content and configuration (layout) of the message body may determine a message type. Examples of message types include text messages, map messages, bytes messages, stream messages and object messages. Other message types are also possible. In one embodiment, the message body is formatted using an extensible markup language (XML). Use of XML allows flexible information formats to be implemented. Other flexible information formats, such as standard generalized markup language (SGML) may also be used for the message body.

Services 110 and 130 may be discretely defined sets of contiguous and autonomous functionality (e.g., business functionality, technical functionality, etc.). Services 110 and 130 may be resident on personal computers (PC), servers, routers, etc. Each service 110 and 130 may represent a process, activity or other resource that can be accessed and used by other services or clients on network 135. Each service 110 and 130 may be independent of other services 110 and 130, and may be accessed without knowledge of its underlying platform implementation.

In an example for a business function of "managing orders," services may include, for example, create order, fulfill order, ship order, invoice order, cancel/update order, etc. Each such service may be autonomous from the other services that are used to manage orders, and may be remote from one another and have different platform implementations. However, the services may be combined and used by one or more applications to manage orders.

Each service may have a service address to which messages directed to the service are sent. The service address is included in a header of a message. A format of the service address may depend on a transport mechanism used by the service. For example, if the transport mechanism is HTTP or FTP, then the service address may include a host number and a port number. If, on the other hand, the transport mechanism is JMS, the service address may be a JMS queue number. If a message is sent to an incorrect service address, a message cannot be processed by the service.

In the illustrated embodiment, the first service 110 is a message consumer. Alternatively, first client 105, additional clients 125, core ESB services 115 or additional services 130 may be message consumers. A message consumer receives a message generated by a message producer, and sent to an address (e.g., service address or client address) of the message consumer. Based on the content of the message, the message consumer may store information contained in the message, generate a response message to send to a service or client, undergo a state change, and/or initiate some other event. A state change initiated by a message may be dependent on contents of the message (e.g., the message body, message context, etc.), rules governing responses to the message, etc.

In one embodiment, the distributed computing system 100 includes an ESB that has a collection of core ESB services 115. The core ESB services 115 act on messages that flow through the ESB. Messages can also be directed towards any of the core ESB services 115 in the same manner as described above with reference to the first service 110 and additional services 130. Any of the core ESB services 115 may include one or more general purpose computing devices (e.g., personal computer or server) and/or a special purpose computing devices configured to act on messages that flow between message producers (e.g., clients or services) and message consumers (e.g., clients or services) within the ESB.

In one embodiment, the core ESB services 115 include a service registry 145. The service registry 145 includes information on some or all services of the ESB. In one embodiment, the service registry 145 includes multiple service entries, each of which includes service information for a single service or set of services. A service entry may include a formal service description (e.g., identifying a service as a flight booking service), service policy (which may include message context requirements (e.g., custom fields or filters, transactional information, security information, transactional requirements, reliability characteristics, whether the service is secure, etc.), service capabilities, protocol and message format requirements, etc.), and a service address (e.g., a host number and a port number for services using HTTP or FTP, a JMS queue name for services using JMS, etc.).

A client 105, 125 may search the service registry 145 to determine what services are available on the ESB, and where the services are located (e.g., the service addresses). The search may be performed by sending a message to the service registry 145 requesting information on one or more services, types of services, etc. (e.g., by using a search query, or by browsing the service registry 145). Once an appropriate service has been identified, the client 105, 125 may send a message to the service 110, 130 using an appropriate service address.

For a service 110, 130 to be included in the service registry 145, that service may send a message to the service registry 145 identifying information about the service (e.g., service policy, service address, description, etc.). Services 110, 130 on the ESB may occasionally be modified to change a service address, and the service registry 145 may be notified of the modification. When the service registry 145 is next updated, the new service address will be reflected in the service registry 145.

In one embodiment, the core ESB services 115 include a content based router 120. The content based router 120 is a service of the ESB that monitors the network 135 for messages, and transparently routes the messages between clients and services.

In one embodiment, the content based router 120 acts as a forwarder for one or more services on the ESB (e.g., first service 110). When the content based router 120 intercepts a message from a message producer (e.g., first client 105), the content based router 120 may examine a header and/or other contents of the message to determine whether it is directed to an active service address or addresses of the service. Those messages directed to a specific service address that is no longer active are then forwarded to a specified different service address. A service may therefore receive messages that are sent to old service addresses that are no longer active. For example, content based router 120 may be set to forward all messages addressed to a first (old) service address of first service 110 to a second (new) service address of first service 110. First service 110 may therefore be moved as necessary without inconvenience to clients 105, 125.

In another embodiment, content based router 120 acts as a switchboard, directing some or all message traffic between clients 105, 125 and services 110, 115, 130. In such an embodiment, some or all messages may be directed to the content based router 120. A client 105, 125 may not need to know a service address of an intended service to send a message to it. Instead, a client may only need to know a name or other identifying information of the service 110, 115, 130. Content based router 120 may then direct incoming messages to appropriate services based on service names or other identifying information.

Content based router 120 may maintain a list of some or all services 110, 115, 130 on the ESB, along with a current service address for each service. The list of service addresses may be used to send each received message to an appropriate service address of an intended service. Content based router 120 may receive service address updates from services 110, 115, 130 as services are relocated. So long as services promptly notify the content based router 120 of updated service addresses, services may be relocated at the discretion of service providers without inconveniencing clients 105, 125.

The core ESB services 115 may include one or more additional modules 150, each of which may be a service of the ESB. Examples of additional modules 150 include modules that provide services for splitting a message into multiple messages, combining multiple messages into a single message, transforming messages from a first format to a second format, applying rules to a message, storing copies of messages, etc. Each additional module 150 may provide a service to clients 105 and 125 and/or services 110 and 130 of the distributed computing system 100.

Figure 2A:
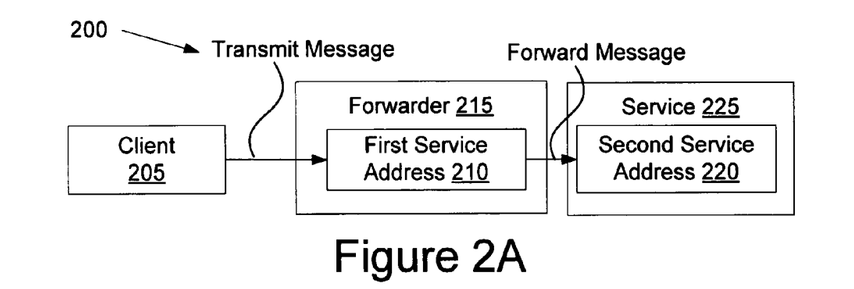
FIG. 2A illustrates a data flow diagram showing a message flowing through an ESB, in accordance with one embodiment of the present invention.

FIG. 2A illustrates a data flow diagram 200 showing a message flowing through an ESB, in accordance with one embodiment of the present invention. In one embodiment, the ESB is included in distributed computing system 100 of FIG. 1.

Returning to FIG. 2A, a client 205 generates a message that is addressed to a first service address 210. Client 205 then transmits the message to the first service address 210.

A forwarder 215 is located at the first service address 210, and receives the message. Forwarder 215 then forwards the message to a second service address 220, at which service 225 (which previously may have been located at the first service address 210) may be located. Forwarder 215 may have been installed at the first service address 210 to forward messages to the second service address 220 when service 225 was moved to the second service address 220. The forwarder 215 may be a simple forwarder that is configured to forward all received messages to second service address 220. Forwarder 215 may forward messages to the second service address 220 regardless of message context, message header, or other message content. Moreover, forwarder 215 may forward messages to second service address 220 without examining the messages. Therefore, clients may not need to query a service registry to determine a new service address of service 225.

Service 225 receives the forwarded message, and processes it. Service 225 may then generate a response message, which may be transmitted back to the client 205. In one embodiment, the response message is sent back to the client 205 through the forwarder 215. Alternatively, the response message may be sent directly to the client 205. Upon receiving the response message, client 205 may be informed that the service 225 is now at the second service address 220, and subsequent messages may accordingly be sent directly to the second service address 220.

In one embodiment, the first service address 210 and second service address 220 are hosted by a single machine (e.g., by a single server). Alternatively, the first service address 210 and second service address 220 may be hosted by different machines (e.g., by different servers). For the forwarder 215 to be installed at the first service address 210, a server having the first service address 210 may need to remain in operation.

If service 225 is moved multiple times, then multiple forwarders may be used. For example, forwarder 215 may continue to forward messages to second service address 220, and an additional forwarder may forward messages to a third service address (not shown). Therefore, messages sent to the first service address 210 would be forwarded to the second service address 220, and then forwarded to the third service address. Alternatively, forwarder 215 may be reconfigured to forward messages to the third service address. Therefore, messages sent to the first service address 210 would be forwarded to the third service address, and messages sent to the second service address 220 would also be forwarded to the third service address.

Figure 2B:
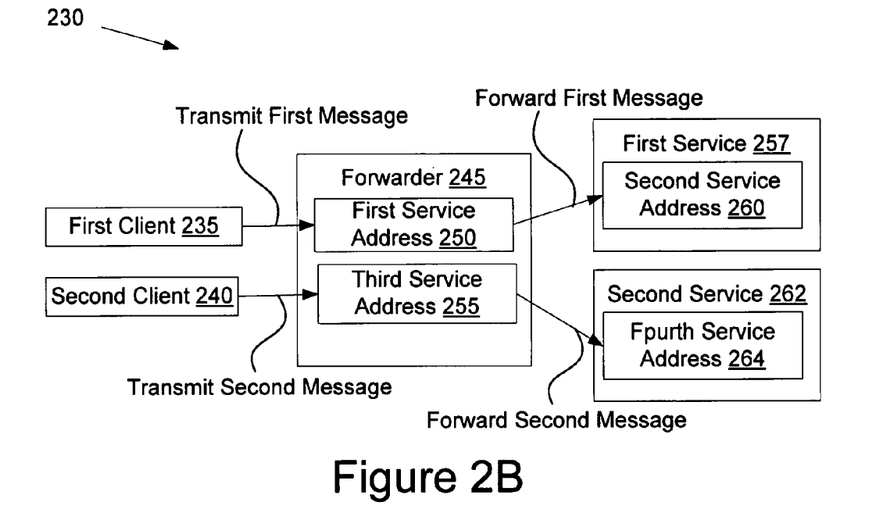
FIG. 2B illustrates a data flow diagram showing messages flowing through an ESB, in accordance with another embodiment of the present invention.

FIG. 2B illustrates a data flow diagram 230 showing messages flowing through an ESB, in accordance with another embodiment of the present invention. In one embodiment, the ESB is included in distributed computing system 100 of FIG. 1.

Returning to FIG. 2B, a first client 235 generates a first message addressed to a first service address 250, to which the first message is sent. A second client 240 generates a second message addressed to a third service address 255, to which the second message is sent.

A forwarder 245 is hosted by a machine (e.g., a server) covering the first service address 250 and the third service address 255. The forwarder 245 may monitor the first service address 250 and third service address 255 for received messages. Forwarder 245 may receive the first message and the second message when they arrive at the first service address 250 and the third service address 255, respectively. Forwarder 245 may then examine a header of the first message and the second message. Forwarder 245 may forward messages sent to the first service address 250 to a second service address 260, and may forward messages sent to the third service address 255 to a fourth service address 264. Alternatively, a separate forwarder may be located at each of the first service address 250 and the third service address 255. Such separate forwarders may not need to examine a header of a message to determine where the message should be forwarded.

A first service 257 is located at the second service address 260, and receives the first forwarded message. First service 257 may process the first forwarded message and generate a first response message, which may be transmitted back to the first client 235. A second service 262 is located at the fourth service address 264, and receives the second forwarded message. Second service 257 may process the second forwarded message and generate a second response message, which may be transmitted back to the second client 240. Response messages may be sent back to the appropriate clients 235, 240 through the forwarder 245. Alternatively, the response messages may be sent directly to the clients 235, 240.

Figure 2C:
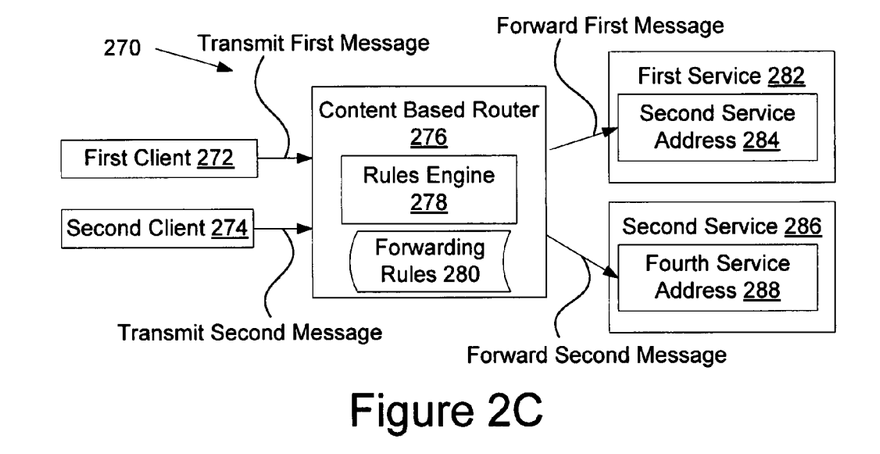
FIG. 2C illustrates a data flow diagram showing messages flowing through an ESB, in accordance with yet another embodiment of the present invention.

FIG. 2C illustrates a data flow diagram 270 showing messages flowing through an ESB, in accordance with yet another embodiment of the present invention. In one embodiment, the ESB is included in a distributed computing system 100 of FIG. 1.

Returning to FIG. 2C, a first client 235 generates a first message and sends it to a first service address (not shown). A second client 240 generates a second message and sends it to a third service address (not shown).

A content based router 276 (described above with reference to FIG. 1) intercepts the first message and the second message. In one embodiment, the content based router 276 includes a rules engine 278 and one or more forwarding rules 280.

The rules engine 278 is a logic component that processes rules (e.g., forwarding rules 280) to produce outcomes. The rules engine 278 may match facts, data and rules, and infer conclusions which may result in actions or events of, for example, a message consumer. In one embodiment, the rules engine 278 matches the facts, data and rules using a Rete Algorithm. Alternatively, the rules engine may use a Linear Algorithm, Treat Algorithm, Leaps Algorithm, etc. Hybrid algorithms that use combinations of, for example, the Leaps Algorithm and the Rete Algorithm, may also be used.

Forwarding rules 280 are rules that are processed by rules engine 278. Each of the forwarding rules 280 may identify a forwarding address or forwarding addresses for one or more original addresses. Therefore, when content based router 276 receives the first message, it may process a first forwarding rule to determine that the first message (addressed to the first service address) should be sent to a second service address 284. Likewise, when the content based router receives the second message, it may process a second forwarding rule (or the first forwarding rule) to determine that the second message (addressed to the third service address) should be forwarded to the fourth service address. Content based router 276 may then forward the first message to the second service address 284 and the second message to the fourth service address 288 in accordance with the forwarding rules 280.

Use of the content based router 276 as a forwarder allows a machine (e.g., a server) on which a service was originally located to be shut down. Other forwarders (e.g., those located at the first service address or third service address) may require that the machine on which the service was originally located remain activated and connected to the ESB.

A first service 282 is located at the second service address 284, and receives the first forwarded message. First service 282 may process the first forwarded message and generate a first response message, which may be transmitted back to the first client 272. A second service 286 is located at the fourth service address 288, and receives the second forwarded message. Second service 286 may process the second forwarded message and generate a second response message, which may be transmitted back to the second client 274. Response messages may be sent back to the appropriate clients 272, 274 through the content based router 276. Alternatively, the response messages may be sent directly to the clients 272, 274.

Figure 3:
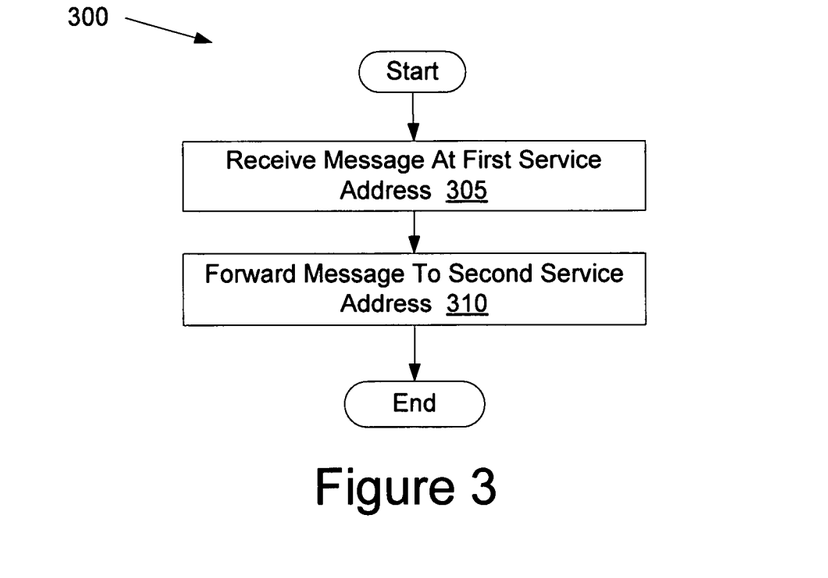
FIG. 3 illustrates a flow diagram of one embodiment for a method of forwarding messages in a distributed computing system.

FIG. 3 illustrates a flow diagram of one embodiment for a method 300 of forwarding messages in a distributed computing system. In one embodiment, the distributed computing system is a service oriented architecture (SOA) that includes an enterprise service bus (ESB). The method may be performed by processing logic that may comprise hardware (e.g., circuitry, dedicated logic, programmable logic, microcode, etc.), software (such as instructions run on a processing device), or a combination thereof. In one embodiment, method 300 is performed by one or more services of distributed computing system 100 of FIG. 1.

Referring to FIG. 3, method 300 includes receiving a message at a first service address (block 305). At block 310, the message is forwarded to a second service address. In one embodiment, the message is forwarded to the second service address without examining the contents of the message (e.g., the message header, message context, etc.). In another embodiment, the message is forwarded after examining a header of the message to determine a service address to which the message is addressed. In yet another embodiment, the message is forwarded after examining additional message contents of the message.

Figure 4:
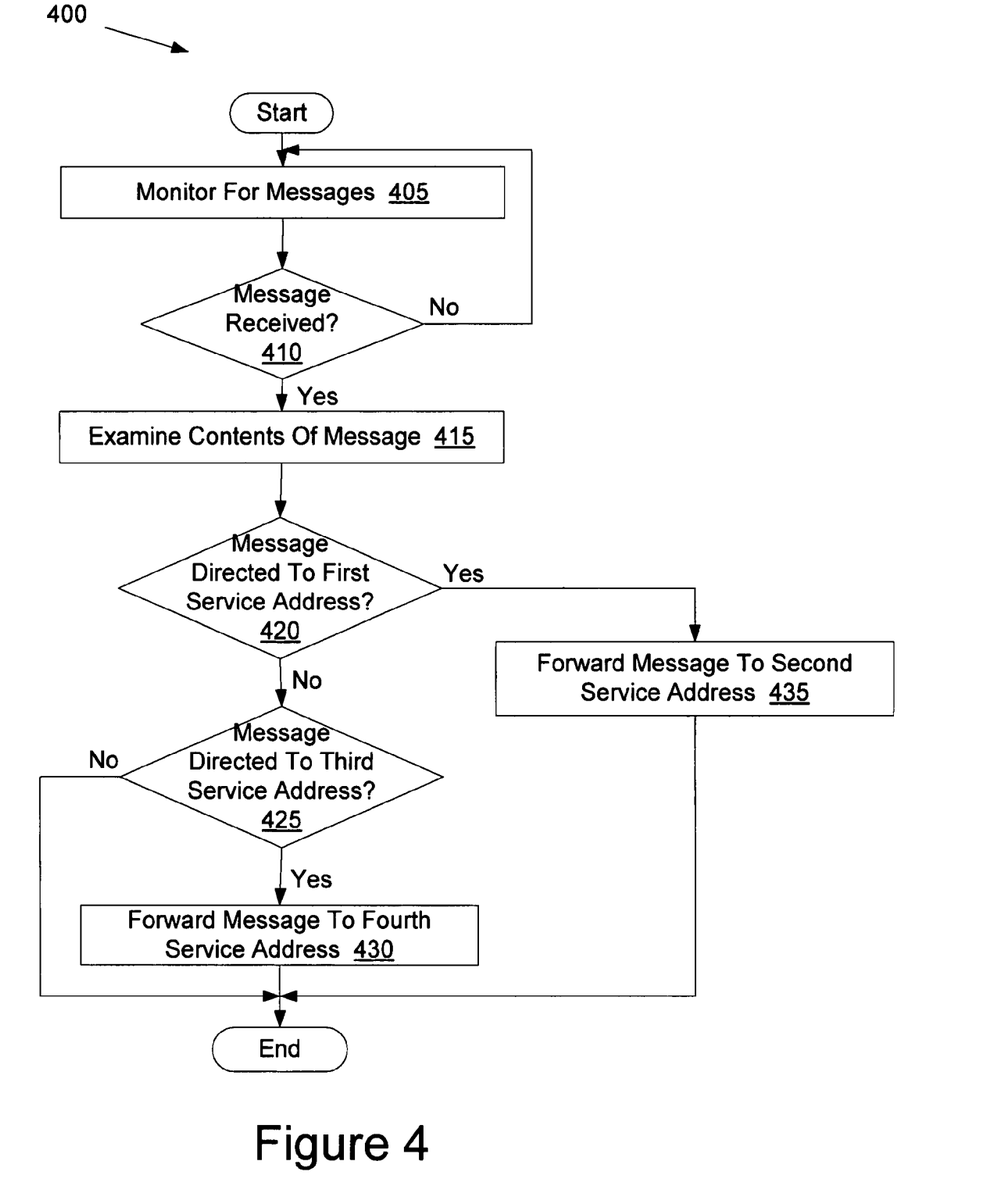
FIG. 4 illustrates a flow diagram of another embodiment for a method 400 of forwarding messages in a distributed computing system.

FIG. 4 illustrates a flow diagram of another embodiment for a method 400 of forwarding messages in a distributed computing system. In one embodiment, the distributed computing system is a service oriented architecture (SOA) that includes an enterprise service bus (ESB). The method may be performed by processing logic that may comprise hardware (e.g., circuitry, dedicated logic, programmable logic, microcode, etc.), software (such as instructions run on a processing device), or a combination thereof. In one embodiment, method 400 is performed by one or more services of distributed computing system 100 of FIG. 1.

Referring to FIG. 4, method 400 includes monitoring for messages (block 405). In one embodiment, all messages passing through an ESB are monitored (e.g., by a content based router). Alternatively, one or more service addresses may be monitored for incoming messages.

At block 415 processing logic determines whether a message has been received (e.g., by a content based router or at a service address). If a message is received, the method proceeds to block 415. If no message is received, the method continues to block 405, and processing logic continues to monitor for messages.

At block 415, the contents of a received message are examined. In one embodiment, only a header of the received message is examined. Alternatively, other contents of the received message may be examined, such as a message context and message body.

At block 420, processing logic determines whether the message is directed to a first service address. If the message is directed to the first service address, the method proceeds to block 435, and the message is forwarded to a second service address. If the message is not directed to the first service address, the method continues to block 425.

At block 425, processing logic determines whether the message is directed to a third service address. If the message is directed to the third service address, the method proceeds to block 430, and the message is forwarded to a fourth service address. If the message is not directed to the third service address, the method ends.

Though method 400 has been discussed with reference to messages directed to a first and a second service address, method 400 may equally apply to messages directed to additional service addresses. For example, different forwarding rules and/or forwarders may be used to forward messages directed to five different service addresses, ten different service address, etc. Therefore, method 400 may accommodate any number of services that change service addresses in a distributed computing system.

Figure 5:
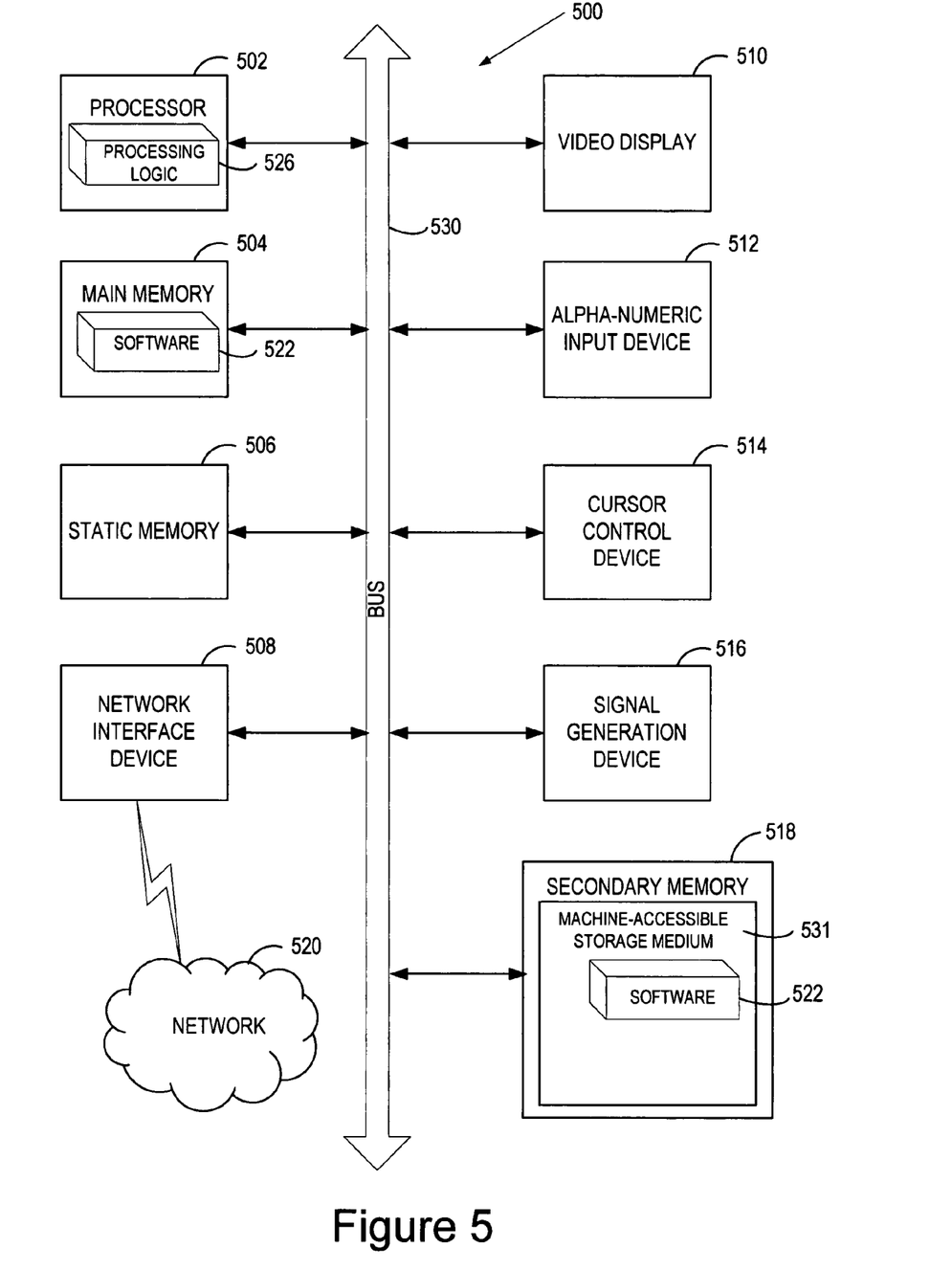
FIG. 5 illustrates a block diagram of an exemplary computer system, in accordance with one embodiment of the present invention.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 531 on which is stored one or more sets of instructions (e.g., software 522) embodying any one or more of the methodologies or functions described herein. The software 522 may also reside, completely or at least partially, within the main memory 504 and/or within the processor 502 during execution thereof by the computer system 500, the main memory 504 and the processor 502 also constituting machine-accessible storage media. The software 522 may further be transmitted or received over a network 520 via the network interface device 508.

The machine-accessible storage medium 531 may also be used to store data structure sets that define user identifying states and user preferences that define user profiles. Data structure sets and user profiles may also be stored in other sections of computer system 500, such as static memory 506.

While the machine-accessible storage medium 531 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:
receiving, by a processing device, a first message directed to a first service address in a distributed computing environment having a service oriented architecture, wherein the first message is directed to a service that was previously present at the first service address but that is no longer present at the first service address;
processing, by the processing device, a first rule to determine whether the first message is to be sent to a second service address, wherein the first rule comprises one of a rete algorithm, linear algorithm, treat algorithm or leaps algorithm;
receiving, by the processing device, a second message directed to a third service address in a distributed computing environment having a service oriented architecture, wherein the second message is directed to a second service that was previously presented at the third service address but is no longer present at the third service address; and
processing, by the processing device, a second rule to determine whether the second message is to be sent to a fourth service address, wherein the second rule is different from the first rule.

2. The method of claim 1, further comprising:
forwarding the second message to the fourth service address at which the second service is located.

3. The method of claim 1 further comprising forwarding the first message to the second service address at which the service is located.

4. The method of claim 3, wherein the first message is forwarded to the second service address regardless of contents of a message header, a message context or a message body of the first message.

5. The method of claim 3 further comprising receiving a first response message from the second service address, wherein the second service address processes the first message to generate the first response message.

6. The method of claim 5 further comprising forwarding the first response message to a first client.

7. The method of claim 2 further comprising receiving a second response message from the fourth service address, wherein the fourth service address processes the second message to generate the second response message.

8. The method of claim 7 further comprising forwarding the second response message to a second client.

9. A non-transitory machine readable storage medium comprising instructions that, when executed by a processing device, cause the processing device to perform operations comprising:
receiving, by the processing device, a first message directed to a first service address in a distributed computing environment having a service oriented architecture, wherein the first message is directed to a service that was previously present at the first service address but that is no longer present at the first service address;
processing, by the processing device, a first rule to determine whether the first message is to be sent to a second service address, wherein the first rule comprises one of a rete algorithm, linear algorithm, treat algorithm or leaps algorithm;
receiving, by the processing device, a second message directed to a third service address in a distributed computing environment having a service oriented architecture, wherein the second message is directed to a second service that was previously present at the third service address but that is no longer present at the third service address; and
processing, by the processing device, a second rule to determine whether the second message is to be sent to a fourth service address, wherein the second rule is different from the first rule.

10. The non-transitory machine readable storage medium of claim 9, wherein the operations further comprising forwarding the first message to the second service address at which the service is located.

11. The non-transitory machine readable storage medium of claim 10, wherein the first message is forwarded to the second service address regardless of contents of a message context or a message body of the message.

12. The non-transitory machine readable storage medium of claim 10, wherein the operations further comprising receiving a first response message from the second service address, wherein the second service address processes the first message to generate the first response message.

13. The non-transitory machine readable storage medium of claim 12, wherein the operations further comprising forwarding the first response message to a first client.

14. The non-transitory machine readable storage medium of claim 9, the operations further comprising:
forwarding the second message to the fourth service address at which the second service is located.

15. The non-transitory machine readable storage medium of claim 14, wherein the operations further comprising receiving a second response message from the fourth service address, wherein the fourth service address processes the second message to generate the second response message.

16. The non-transitory machine readable storage medium of claim 15, wherein the operations further comprising forwarding the second response message to a second client.

17. A system comprising:
a memory;
a processing device coupled to the memory, wherein the processing device is to:
receive a first message directed to a first service address in a distributed computing environment having a service oriented architecture, wherein the first message is directed to a service that was previously present at the first service address but that is no longer present at the first service address;
process a first rule to determine whether the first message is to be sent to a second service address, wherein the first rule comprises one of rete algorithm, linear algorithm, treat algorithm or leaps algorithm;
receive a second message directed to a third service address in a distributed computing environment having a service oriented architecture, wherein the second message is directed to a second service that was previously present at the third service address but that is no longer present at the third service address; and
process a second rule to determine whether the second message is to be sent to a fourth service address, wherein the second rule is different from the first rule.

18. The system of claim 17, the processing device is to forward the second message to the fourth service address at which the second service is located.

19. The system of claim 17, the processing device to forward the first message to the second service address at which the service is located.

20. The system of claim 19, wherein the first message is forwarded to the second service address regardless of contents of a message header, a message context or a message body of the first message.

21. The system of claim 19, the processing device to receive a first response message from the second service address, wherein the second service address processes the first message to generate the first response message.

22. The system of claim 21, the processing device to forward the first response message to a first client.

23. The system of claim 18, the processing device to receive a second response message from the fourth service address, wherein the fourth service address processes the second message to generate the second response message.

24. The system of claim 23, the processing device to forward the second response message to a second client.

* * * * *